N. CHAPIN.
Churn.
No. 137. Reissued May 15, 1849.
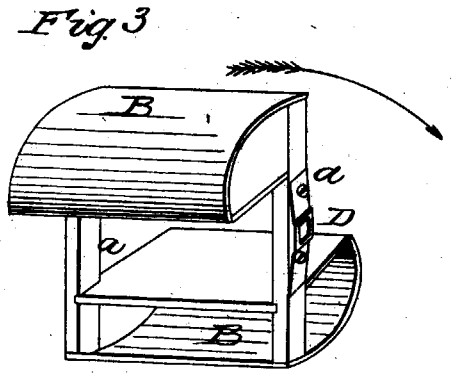
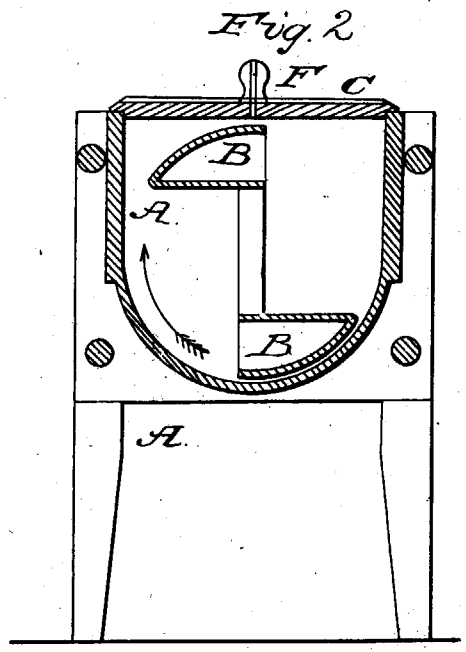
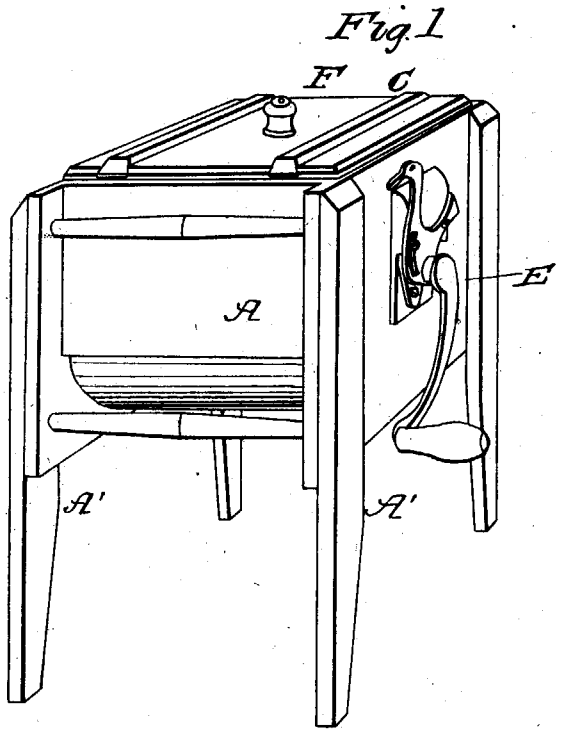
N. PETERS. Photo-Lithographer, Washington, D.C.

UNITED STATES PATENT OFFICE.

NATHAN CHAPIN, OF SYRACUSE, NEW YORK, ASSIGNOR, BY MESNE ASSIGNMENTS, TO CHARLES J. ANTHONY.

IMPROVEMENT IN ATMOSPHERIC CHURN-DASHERS.

Specification forming part of Letters Patent No. 5,560, dated May 9, 1848; Reissue No. 137, dated May 15, 1849.

*To all whom it may concern:*

Be it known that I, NATHAN CHAPIN, of Syracuse, in the county of Onondaga and State of New York, have invented a new and Improved Churn, which I denominate "Chapin's Atmospheric Churn;" and I do hereby declare the following to be a full and exact description thereof, reference being had to the accompanying drawings, making a part of this specification.

Figure 1 is a perspective view of my improved churn; Fig. 2, a vertical transverse section through its center, and Fig. 3 a perspective view of the dasher detached from the churn.

Similar letters indicate like parts in all the figures.

The nature of my invention consists in the employment of open-mouthed buckets or beaters having a cavity or cavities formed in their front or beating surfaces in a vessel partially filled with milk or cream for the purpose of enabling the buckets or beaters as they are operated to pass through air and cream or milk, and thereby to force quantities of air into and among the cream or milk, and to lift portions of the cream or milk into the atmosphere in the upper portion of the churn by means of the said cavities in the beaters, by which the agitating mechanical action produced by the beaters will be greatly increased at the same time that a chemical influence is exerted by the oxygen of the atmosphere that will greatly accelerate the production of butter.

In the accompanying drawings, A is the churn-box having vertical sides and ends and a curved bottom. B B are the beating-buckets secured to the extremities of the arms *a a*. The buckets are suspended in the box by means of a pivot projecting from one end of the box into a socket in the center of the outer side of one of the arms *a* and the axle E of the crank, which passes through the opposite end of the box, and fits into a metallic socket, D, secured to the outer side of the opposite arm *a;* or the churn-dasher may be secured and operated in the churn-box or receptacle in any other manner that may be deemed expedient.

The churn will operate to the best advantage when the surface of the milk or cream in the box is on a line with or below the axis of the dasher.

I do not intend to limit myself to the use of any particular number of buckets or beaters in the formation of a churn-dasher; nor to any particular form of bucket or beater, nor to any particular form of the cavity or cavities in the buckets or beaters.

What I claim as my invention, and desire to secure by Letters Patent, is—

The employment of open-mouthed buckets or beaters having a cavity or cavities formed in their front or beating surfaces in a vessel partially filled with milk or cream for the purpose of enabling the buckets or beaters as they are operated to pass through air and cream or milk, and thereby to force quantities of air into the cream or milk, and to lift portions of the cream or milk into the atmosphere in the upper portion of the churn by means of the said cavities in the beaters, for the purpose herein set forth.

Dated March 22, 1849.

NATHAN CHAPIN.

Witnesses:

JASPER SMITH,
CHARLES J. ANTHONY.